US011067164B2

(12) United States Patent
Henion et al.

(10) Patent No.: US 11,067,164 B2
(45) Date of Patent: Jul. 20, 2021

(54) ELECTRONIC GEAR SHIFTER ASSEMBLY FOR A DUAL-MODE FLYING AND DRIVING VEHICLE

(71) Applicant: Terrafugia, Inc., Woburn, MA (US)

(72) Inventors: Julie Henion, Arlington, MA (US);
Kevin Colburn, Lexington, MA (US);
Carl C. Dietrich, Petaluma, CA (US);
Dagny Dukach, Boston, MA (US);
Edmund Golaski, Cambridge, MA (US); Andrew Heafitz, Cambridge, MA (US); Elizabeth Von Der Heydt, Carlisle, MA (US); Lluis Penalver-Aguila, Newton, MA (US);
Bryan Sandoz, Winchester, MA (US);
Ethan Stowe, Hampstead, NH (US)

(73) Assignee: Terrafugia, Inc., Woburn, MA (US)

( * ) Notice: Subject to any disclaimer, the term of this patent is extended or adjusted under 35 U.S.C. 154(b) by 402 days.

(21) Appl. No.: 15/486,835

(22) Filed: Apr. 13, 2017

(65) Prior Publication Data
US 2017/0299049 A1    Oct. 19, 2017

Related U.S. Application Data

(60) Provisional application No. 62/323,290, filed on Apr. 15, 2016.

(51) Int. Cl.
*F16H 59/02* (2006.01)
*B60F 5/02* (2006.01)
(Continued)

(52) U.S. Cl.
CPC ............. *F16H 59/105* (2013.01); *B60F 5/02* (2013.01); *B64C 13/0421* (2018.01);
(Continued)

(58) Field of Classification Search
CPC ............ B60F 5/02; B64C 37/00; B64C 13/04
See application file for complete search history.

(56) References Cited

U.S. PATENT DOCUMENTS

| 827,017 A | 7/1906 | Hofmann |
| 1,286,679 A | 12/1918 | Longobardi |

(Continued)

FOREIGN PATENT DOCUMENTS

| CN | 1784338 A | 6/2006 |
| CN | 201385556 Y | 1/2010 |

(Continued)

OTHER PUBLICATIONS

International Search Report and Written Opinion of the International Searching Authority for PCT/US2007/000256, dated Apr. 7, 2008.

(Continued)

*Primary Examiner* — Terence Boes
(74) *Attorney, Agent, or Firm* — Patterson Thuente Pedersen, P.A.

(57) ABSTRACT

The present invention relates to an electronic gear shifter assembly for a dual-mode flying and driving vehicle. The electronic gear shifter assembly may include a lever moveable between a first shifting path that includes at least one drive-related operating position, and a second shifting path that includes at least one flying-related operating position.

12 Claims, 9 Drawing Sheets

(51) Int. Cl.
  *B64C 37/00*   (2006.01)
  *F16H 59/10*   (2006.01)
  *B64C 13/04*   (2006.01)
  *F16H 61/36*   (2006.01)

(52) U.S. Cl.
  CPC ......... *B64C 37/00* (2013.01); *F16H 59/0217* (2013.01); *F16H 59/10* (2013.01); *F16H 61/36* (2013.01); *B64C 13/04* (2013.01); *F16H 2059/0239* (2013.01)

(56) References Cited

U.S. PATENT DOCUMENTS

| | | |
|---|---|---|
| 1,731,757 A | 10/1929 | Tubbe |
| 1,756,463 A | 4/1930 | Jezek |
| 1,816,653 A | 7/1931 | Nelsch |
| 1,998,148 A | 4/1935 | Vieriu |
| 2,077,471 A | 4/1937 | Fink |
| D106,939 S | 11/1937 | Waterman |
| 2,135,073 A | 11/1938 | Gerhart |
| 2,166,564 A | 7/1939 | Atwood et al. |
| 2,215,003 A | 9/1940 | Johnson |
| 2,241,577 A | 5/1941 | Beals, Jr. |
| 2,280,809 A | 4/1942 | Evans |
| 2,289,224 A | 7/1942 | Swanson et al. |
| 2,290,850 A | 7/1942 | Umschweif |
| 2,338,751 A | 1/1944 | Zuck |
| 2,373,467 A | 4/1945 | Frakes |
| 2,402,468 A | 6/1946 | Thompson |
| 2,410,234 A | 10/1946 | Read et al. |
| 2,422,056 A | 6/1947 | Vogt |
| 2,424,769 A | 7/1947 | Page |
| 2,427,936 A | 9/1947 | Wales, Jr. |
| 2,430,869 A | 11/1947 | Fulton, Jr. |
| 2,434,068 A | 1/1948 | Geisse |
| 2,446,528 A | 8/1948 | Clark |
| 2,448,862 A | 9/1948 | Conklin |
| 2,462,462 A | 2/1949 | Boggs et al. |
| D153,331 S | 4/1949 | Zuck |
| 2,480,279 A | 8/1949 | Victor et al. |
| D155,569 S | 10/1949 | Bailey |
| 2,494,547 A | 1/1950 | Fish, Jr. |
| 2,538,602 A | 1/1951 | Taylor et al. |
| 2,539,489 A | 1/1951 | Smith |
| 2,544,021 A | 3/1951 | Holland |
| 2,562,490 A | 7/1951 | Hall |
| 2,563,731 A | 8/1951 | Masterson |
| 2,573,271 A | 10/1951 | Perl |
| 2,593,785 A | 4/1952 | Nye et al. |
| 2,609,167 A | 9/1952 | Gero, Jr. |
| 2,624,530 A | 1/1953 | Hanssen |
| 2,811,323 A | 7/1953 | Rethorst |
| 2,666,602 A | 1/1954 | Holland |
| 2,674,422 A | 4/1954 | Pellarini |
| 2,675,976 A | 4/1954 | Gerardine |
| 2,681,773 A | 6/1954 | Rethorst |
| 2,692,095 A | 10/1954 | Carpenter |
| 2,712,421 A | 7/1955 | Naumann |
| 2,713,465 A | 7/1955 | Novinger |
| 2,734,705 A | 2/1956 | Robertson |
| 2,767,939 A | 10/1956 | Taylor |
| 2,770,427 A | 11/1956 | Schreffler |
| 2,777,649 A | 1/1957 | Williams |
| 2,893,661 A | 7/1959 | Aylor |
| 2,923,494 A | 2/1960 | Strong |
| 2,923,681 A | 2/1960 | Hein et al. |
| 2,936,969 A | 5/1960 | Griffith et al. |
| 2,939,649 A | 6/1960 | Shaw |
| 2,940,688 A | 6/1960 | Bland |
| 2,945,646 A | 7/1960 | Sturgeon |
| 2,955,780 A | 10/1960 | Hulbert |
| 2,968,453 A | 1/1961 | Bright |
| 2,972,898 A | 2/1961 | Hartel |
| 2,973,921 A | 3/1961 | Price |
| 2,975,676 A | 3/1961 | Butler |
| 2,988,301 A | 6/1961 | Fletcher |
| 3,012,737 A | 12/1961 | Dodd |
| 3,029,042 A | 4/1962 | Martin |
| 3,039,537 A | 6/1962 | Heidelberg |
| 3,056,654 A | 10/1962 | Barrer et al. |
| 3,065,927 A | 11/1962 | Mills |
| 3,083,936 A | 4/1963 | Rethorst |
| 3,090,581 A | 5/1963 | Einarsson |
| 3,134,560 A | 5/1964 | Halsmer |
| 3,139,244 A | 6/1964 | Bright |
| 3,161,374 A | 12/1964 | Allred et al. |
| 3,167,273 A | 1/1965 | Alvarez Calderson |
| 3,174,573 A | 3/1965 | Chaplin |
| 3,179,353 A | 4/1965 | Peterson |
| 3,179,354 A | 4/1965 | Alvarez Calderson |
| 3,184,183 A | 5/1965 | Piasecki |
| 3,198,082 A | 8/1965 | Kerris |
| 3,201,067 A | 8/1965 | Meyerhoff |
| 3,203,645 A | 8/1965 | Shaw |
| 3,231,221 A | 1/1966 | Platt |
| 3,244,246 A | 4/1966 | Wieiland |
| 3,261,572 A | 7/1966 | Gorton |
| 3,265,326 A | 8/1966 | Mach et al. |
| 3,265,329 A | 8/1966 | Postelson |
| 3,289,977 A | 12/1966 | Staats |
| 3,317,161 A | 5/1967 | Sawyer |
| 3,371,886 A | 3/1968 | Schertz |
| 3,383,074 A | 5/1968 | Coplin |
| 3,397,852 A | 8/1968 | Katzen |
| 3,397,854 A | 8/1968 | Reyle |
| 3,454,238 A | 7/1969 | Goodson |
| 3,481,559 A | 12/1969 | Apostolescu |
| 3,515,500 A | 6/1970 | Nachod |
| 3,519,224 A | 7/1970 | Boyd et al. |
| 3,528,630 A | 9/1970 | Ferris et al. |
| 3,559,921 A | 2/1971 | Timperman |
| 3,584,810 A | 6/1971 | Velton |
| 3,605,935 A | 9/1971 | Gilbert |
| 3,612,440 A | 10/1971 | Strong |
| 3,627,235 A | 12/1971 | Lippisch |
| 3,645,474 A | 2/1972 | Arbuse |
| 3,665,809 A | 5/1972 | Walker et al. |
| 3,713,748 A | 1/1973 | Langley |
| 3,827,527 A | 8/1974 | Bertelsen |
| 3,873,049 A | 3/1975 | Horsdal |
| 3,912,201 A | 10/1975 | Bradbury |
| 3,931,942 A | 1/1976 | Alpert |
| 3,960,103 A | 6/1976 | Rey |
| 4,022,403 A | 5/1977 | Chiquet |
| 4,043,421 A | 8/1977 | Smith |
| 4,194,707 A | 3/1980 | Sharpe |
| 4,240,601 A | 12/1980 | Reed |
| 4,269,374 A | 5/1981 | Miller |
| 4,358,072 A | 11/1982 | Williamson |
| 4,505,442 A | 3/1985 | Kirsch et al. |
| 4,505,443 A | 3/1985 | Bradfield et al. |
| 4,559,822 A | 12/1985 | Huntington |
| 4,579,297 A | 4/1986 | Ayoola |
| 4,598,890 A | 7/1986 | Herzog et al. |
| 4,627,585 A | 12/1986 | Einstein |
| 4,754,940 A | 7/1988 | Deter |
| 4,765,568 A | 8/1988 | Carl et al. |
| 4,778,129 A | 10/1988 | Byford |
| 4,795,111 A | 1/1989 | Moller |
| 4,796,836 A | 1/1989 | Buchelt |
| 4,824,048 A | 4/1989 | Kim |
| 4,828,203 A | 5/1989 | Clifton et al. |
| 4,834,319 A | 5/1989 | Ewy et al. |
| 4,856,732 A | 8/1989 | Eickmann |
| 4,865,275 A | 9/1989 | Thompson |
| 4,881,700 A | 11/1989 | Sarh |
| 4,881,701 A | 11/1989 | Bullard |
| 4,892,274 A | 1/1990 | Pohl et al. |
| 4,899,954 A | 2/1990 | Pruszenski, Jr. |
| 4,913,375 A | 4/1990 | Fitzpatrick |
| 4,917,332 A | 4/1990 | Patterson, Jr. |
| 4,936,629 A | 6/1990 | Young |
| 4,986,493 A | 1/1991 | Sarh |
| 5,025,382 A | 6/1991 | Artz |

(56) References Cited

U.S. PATENT DOCUMENTS

| | | |
|---|---|---|
| 5,050,817 A | 9/1991 | Miller |
| 5,064,143 A | 11/1991 | Bucher |
| 5,101,927 A | 4/1992 | Murtuza |
| 5,115,996 A | 5/1992 | Moller |
| 5,141,173 A | 8/1992 | Lay |
| D331,893 S | 12/1992 | Szakacs |
| 5,201,478 A | 4/1993 | Wooley |
| 5,201,479 A | 4/1993 | Renzelmann |
| 5,203,520 A | 4/1993 | Przygodzki et al. |
| 5,209,428 A | 5/1993 | Bevilaqu et al. |
| 5,226,350 A | 7/1993 | Cycon et al. |
| 5,297,761 A | 3/1994 | Kendall, Jr. et al. |
| 5,310,138 A | 5/1994 | Fitzgibbon |
| 5,350,135 A | 9/1994 | Renzelmann et al. |
| 5,356,094 A | 10/1994 | Sylvain |
| 5,381,985 A | 1/1995 | Wechsler et al. |
| 5,381,986 A | 1/1995 | Smith et al. |
| 5,419,514 A | 5/1995 | Ducan |
| 5,427,329 A | 6/1995 | Renzelmann et al. |
| 5,452,643 A | 9/1995 | Smith et al. |
| 5,454,531 A | 10/1995 | Melkuti |
| 30,262,657 | 7/1996 | Anker-Holth |
| 5,558,299 A | 9/1996 | Veile |
| 5,645,250 A | 7/1997 | Gevers |
| 5,666,483 A | 9/1997 | McClary |
| 5,746,390 A | 5/1998 | Chiappetta |
| 5,765,783 A | 6/1998 | Albion |
| 5,806,805 A | 9/1998 | Elbert et al. |
| 5,823,470 A | 10/1998 | Craig et al. |
| 5,836,541 A | 11/1998 | Pham |
| 5,842,667 A | 12/1998 | Jones |
| 5,850,990 A | 12/1998 | Gevers |
| 5,890,441 A | 4/1999 | Swinson et al. |
| 5,984,228 A | 11/1999 | Pham |
| 6,073,882 A | 6/2000 | Zieger |
| 6,082,665 A | 7/2000 | Spitzer |
| 6,085,151 A | 7/2000 | Farmer et al. |
| 6,086,014 A | 7/2000 | Bragg, Jr. |
| 6,089,501 A | 7/2000 | Frost |
| 6,098,927 A | 8/2000 | Gevers |
| 6,105,901 A | 8/2000 | Ulanoski et al. |
| 6,119,985 A | 9/2000 | Clapp et al. |
| 6,129,306 A | 10/2000 | Pham |
| 6,131,848 A | 10/2000 | Crow |
| 6,170,778 B1 | 1/2001 | Cycon et al. |
| 6,186,574 B1 | 2/2001 | Motozawa et al. |
| 6,224,012 B1 | 5/2001 | Wooley |
| 6,227,481 B1 | 5/2001 | Fenny et al. |
| 6,247,667 B1 | 6/2001 | Fenny et al. |
| 6,254,032 B1 | 7/2001 | Bucher |
| 6,260,793 B1 | 7/2001 | Balayn et al. |
| 6,270,038 B1 | 8/2001 | Cycon et al. |
| 6,276,633 B1 | 8/2001 | Balayn et al. |
| 6,318,668 B1 | 11/2001 | Ulanoski et al. |
| 6,328,256 B1 | 12/2001 | Ryan et al. |
| 6,343,768 B1 | 2/2002 | Muldoon |
| 6,371,406 B1 | 4/2002 | Corcoran |
| 6,382,559 B1 | 5/2002 | Sutterfield et al. |
| 6,431,494 B1 | 8/2002 | Kinkead et al. |
| 6,446,911 B1 | 9/2002 | Yount et al. |
| 6,457,670 B1 | 10/2002 | Geranio et al. |
| 6,464,166 B1 | 10/2002 | Yoeli |
| 6,474,598 B2 | 11/2002 | Carter, Jr. |
| 6,520,449 B2 | 2/2003 | Illingworth |
| 6,561,456 B1 | 5/2003 | Devine |
| 6,568,630 B2 | 5/2003 | Yoeli |
| 6,607,161 B1 | 8/2003 | Krysinski et al. |
| 6,619,584 B1 | 9/2003 | Haynes |
| 6,644,588 B2 | 11/2003 | King et al. |
| 6,659,394 B1 | 12/2003 | Shenk |
| 6,704,624 B2 | 3/2004 | Ortega et al. |
| 6,708,920 B2 | 3/2004 | Fukuyama et al. |
| 6,745,977 B1 | 6/2004 | Long et al. |
| 6,751,530 B2 | 6/2004 | Seifert et al. |
| 6,786,450 B1 | 9/2004 | Einstein |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,848,649 B2 | 2/2005 | Churchman |
| 6,883,748 B2 | 4/2005 | Yoeli |
| 6,886,776 B2 | 5/2005 | Wagner et al. |
| 6,892,979 B2 | 5/2005 | Milde, Jr. |
| 6,892,980 B2 | 5/2005 | Kawai |
| 6,913,226 B2 | 7/2005 | Huynh |
| 6,926,322 B2 | 8/2005 | Browne et al. |
| 6,974,106 B2 | 12/2005 | Churchman |
| 7,188,802 B2 | 3/2007 | Magre |
| 7,246,769 B2 | 7/2007 | Yoeli |
| 7,249,732 B2 | 7/2007 | Sanders, Jr. et al. |
| 7,267,300 B2 | 9/2007 | Hearth et al. |
| 7,275,712 B2 | 10/2007 | Yoeli |
| D610,066 S | 2/2010 | Au |
| 7,717,368 B2 | 5/2010 | Yoeli |
| 7,789,342 B2 | 9/2010 | Yoeli |
| 7,806,362 B2 | 10/2010 | Yoeli |
| 7,857,253 B2 | 12/2010 | Yoeli |
| 7,866,598 B2 | 1/2011 | Waide et al. |
| 7,871,033 B2 | 1/2011 | Karem et al. |
| 7,913,947 B2 | 3/2011 | Haynes et al. |
| 7,938,358 B2 | 5/2011 | Dietrich et al. |
| 8,162,253 B2 | 4/2012 | Seiford, Sr. |
| 8,210,473 B2 | 7/2012 | Schweighart et al. |
| 9,259,984 B2 | 2/2016 | Brown |
| 9,974,105 B2 | 5/2018 | Sasai et al. |
| 10,518,595 B2 | 12/2019 | Dietrich |
| 2002/0161488 A1 | 10/2002 | Guillemin et al. |
| 2003/0038213 A1 | 2/2003 | Yoeli |
| 2003/0062442 A1 | 4/2003 | Milde, Jr. |
| 2003/0085319 A1 | 5/2003 | Wagner et al. |
| 2003/0094536 A1 | 5/2003 | LaBiche |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2004/0149857 A1 | 8/2004 | Yoeli |
| 2004/0155143 A1 | 8/2004 | Yoeli |
| 2005/0001092 A1 | 1/2005 | Kisor |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0178881 A1 | 8/2005 | Yoeli |
| 2005/0242231 A1 | 11/2005 | Yoeli |
| 2006/0113426 A1 | 6/2006 | Yoeli |
| 2006/0231675 A1 | 10/2006 | Bostan |
| 2007/0034739 A1 | 2/2007 | Yoeli |
| 2007/0095971 A1 | 5/2007 | Yoeli |
| 2007/0158494 A1 | 7/2007 | Burrage |
| 2008/0054121 A1 | 3/2008 | Yoeli |
| 2008/0142643 A1 | 6/2008 | Yoeli |
| 2008/0283673 A1 | 11/2008 | Yoeli |
| 2009/0084907 A1 | 4/2009 | Yoeli |
| 2009/0140102 A1 | 6/2009 | Yoeli |
| 2009/0159757 A1 | 6/2009 | Yoeli |
| 2010/0051740 A1 | 3/2010 | Yoeli |
| 2010/0051742 A1 | 3/2010 | Schweigart et al. |
| 2010/0051753 A1 | 3/2010 | Yoeli |
| 2010/0076625 A1 | 3/2010 | Yoeli |
| 2010/0230532 A1 | 9/2010 | Dietich et al. |
| 2010/0270419 A1 | 10/2010 | Yoeli |
| 2011/0036939 A1 | 2/2011 | Easter |
| 2011/0042507 A1 | 2/2011 | Seiford, Sr. |
| 2013/0025398 A1* | 1/2013 | Choi .............. F16H 59/0204<br>74/473.12 |
| 2013/0193263 A1* | 8/2013 | Schweighart .......... B60F 5/02<br>244/2 |
| 2014/0217230 A1 | 8/2014 | Helou, Jr. |
| 2016/0023527 A1 | 1/2016 | Dietrich |
| 2016/0236774 A1 | 8/2016 | Niedzballa |

(56) References Cited

U.S. PATENT DOCUMENTS

2019/0047342 A1    2/2019   Dietrich
2020/0254839 A1    8/2020   Dietrich

FOREIGN PATENT DOCUMENTS

| CN | 102596718 A | 7/2012 |
| CN | 102774493 A | 11/2012 |
| CN | 105121188 B | 12/2015 |
| CN | 109153302 A | 1/2019 |
| DE | 202014004877 U1 | 7/2014 |
| EP | 2969603 B1 | 5/2017 |
| EP | 3442815 A1 | 2/2019 |
| FR | 2622846 A1 | 5/1989 |
| RU | 2016781 C1 | 7/1994 |
| RU | 2139795 C1 | 10/1999 |
| TW | M418045 U | 12/2011 |
| WO | WO 2007/114877 A2 | 10/2007 |
| WO | WO 2012/012752 A9 | 1/2012 |
| WO | WO 2013/181722 A2 | 12/2013 |
| WO | WO 2014/144001 A2 | 9/2014 |
| WO | WO-2014144001 A2 | 9/2014 |
| WO | WO 2017/180855 A1 | 10/2017 |
| WO | WO 2019/135791 A9 | 7/2019 |

OTHER PUBLICATIONS

Communication Relating to the Results of the Partial International Search for PCT/US2007/000256, dated Oct. 2, 2007.

PCT Search Report and Written Opinion dated Sep. 29, 2017 for PCT Application No. PCT/US17/27393, 11 pages.

Lavars, Nick, "Terrafugia's New VTOL Concept Transfers Detachable Passenger Pods Between Ground and Sky," https://newatlas.com/terrafugia-tf-2-concept-flying-taxi/54201, Apr. 12, 2018, 11 pages.

Application and File history for U.S. Appl. No. 16/730,845, filed Dec. 30, 2019. Inventors: Dietrich as available on PAIR at www.uspto.gov.

Application and File history for U.S. Appl. No. 14/777,247, filed Sep. 15, 2015. Inventors: Dietrich as available on PAIR at www.uspto.gov.

Application and File history for U.S. Appl. No. 13/811,789, filed Apr. 4, 2013. Inventors: Scheighart et al., as available on PAIR at www.uspto.gov.

Application and File history for U.S. Appl. No. 16/058,960, filed Aug. 8, 2018. Inventors: Dietrich, as available on PAIR at www.uspto.gov.

* cited by examiner

ELECTRONIC GEAR SHIFTER ASSEMBLY FOR A DUAL-MODE FLYING AND DRIVING VEHICLE

CROSS-REFERENCE TO RELATED APPLICATION

This application claims priority to and the benefit of, and incorporates herein by reference in its entirety, U.S. Provisional Patent Application No. 62/323,290, which was filed on Apr. 15, 2016.

TECHNICAL FIELD OF THE INVENTION

Embodiments of this invention relate to electronic shifter levers and, more particularly, to a shifter lever that may contain positions related to the functions of a dual-mode flying and driving vehicle, including but not limited to altitude control, takeoff, deploying wings, etc.

BACKGROUND

On an automobile, automatic transmission shifters typically include a shift lever pivotable along a fore-to-aft shifting path between gear positions, such as park, reverse, neutral, drive, low gear, etc.

In the case of a dual-mode flying and driving vehicle (e.g., the vehicles described in WO 2014144001 A2 and U.S. Pat. No. 7,938,358 incorporated herein by reference), there is a need for the operator to have the standard automobile shift positions available, but to also control the vehicle functions related to flight, including: engaging flight propulsion sources such as ducted fans or propellers; activating a takeoff sequence; control of vehicle altitude, heading, and airspeed using simplified controls; and converting the vehicle between a driving configuration and a flying configuration.

SUMMARY OF THE INVENTION

In accordance with embodiments of the invention, a shifter lever includes the standard automobile gearshift positions, as well as additional positions related to flight, such as simplified vehicle controls in the air and re-configuration of the vehicle from a drive configuration to a flight configuration.

In an aspect, embodiments of the invention relate to an electronic gear shifter assembly for a dual-mode flying and driving vehicle. The electronic gear shifter assembly may include a lever moveable between a first shifting path including at least one drive-related operating position and a second shifting path including at least one flying-related operating position.

One or more of the following features may be included. The electronic gear shifter may further include a plate defining an opening, wherein the lever is disposed through the opening. The electronic gear shifter may further include a plate including indicators of the drive-related and flying-related operating positions. The drive-related operating positions may be, e.g., park, reverse, neutral, and/or drive positions. The flying-related operating position may be, e.g., fly, up, and/or down positions. In some embodiments the flying-related operating position may be e.g., convert, up, and/or down positions.

The lever may further include at least one of a pivot, a shift knob, a slide, a shift button, a compression spring, and a gear selector pin. The lever may be moveable in orthogonal directions. The orthogonal directions may include a longitudinal direction and a transverse direction. The longitudinal direction may include two paths connected by a transverse path. The longitudinal direction may be three paths connected by a transverse path. The three paths may include the first shifting path including at least one drive-related operating position; the second shifting path including at least one of fly, up, or down operating positions; and a third shifting path including at least one of convert, up, or down operating positions.

The electronic gear shifter may further include a spring mechanism adapted to return the lever to a central position in the second shifting path. The electronic gear shifter may further include an electronic sensor. The electronic sensor may be, e.g., a limit switch, a Hall effect sensor, or a potentiometer.

Embodiments of the present invention provide systems for combining the above noted control functions into a single cross-functional lever. Combining the functions into one lever eliminates the possibility of a user confusing a drive related shifter lever with a separate flight related control lever. The combination may also reduce the complexity and weight of the overall system.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

A dual-mode flying and driving vehicle, such as that described in U.S. Pat. No. 7,938,358, allows a user to operate the vehicle in either a flying mode or a driving mode. A gear shifter assembly in accordance with embodiments of the invention may allow the user of the dual-mode flying and driving vehicle to switch the vehicle into either the driving mode or the flying mode and then to further operate the vehicle in those functions, by using a single gear shifter. For example, the gear shifter assembly may allow the user to shift the vehicle into the driving mode and then to further shift between drive gears, e.g., drive, neutral, reverse, etc.

Figure 1A:
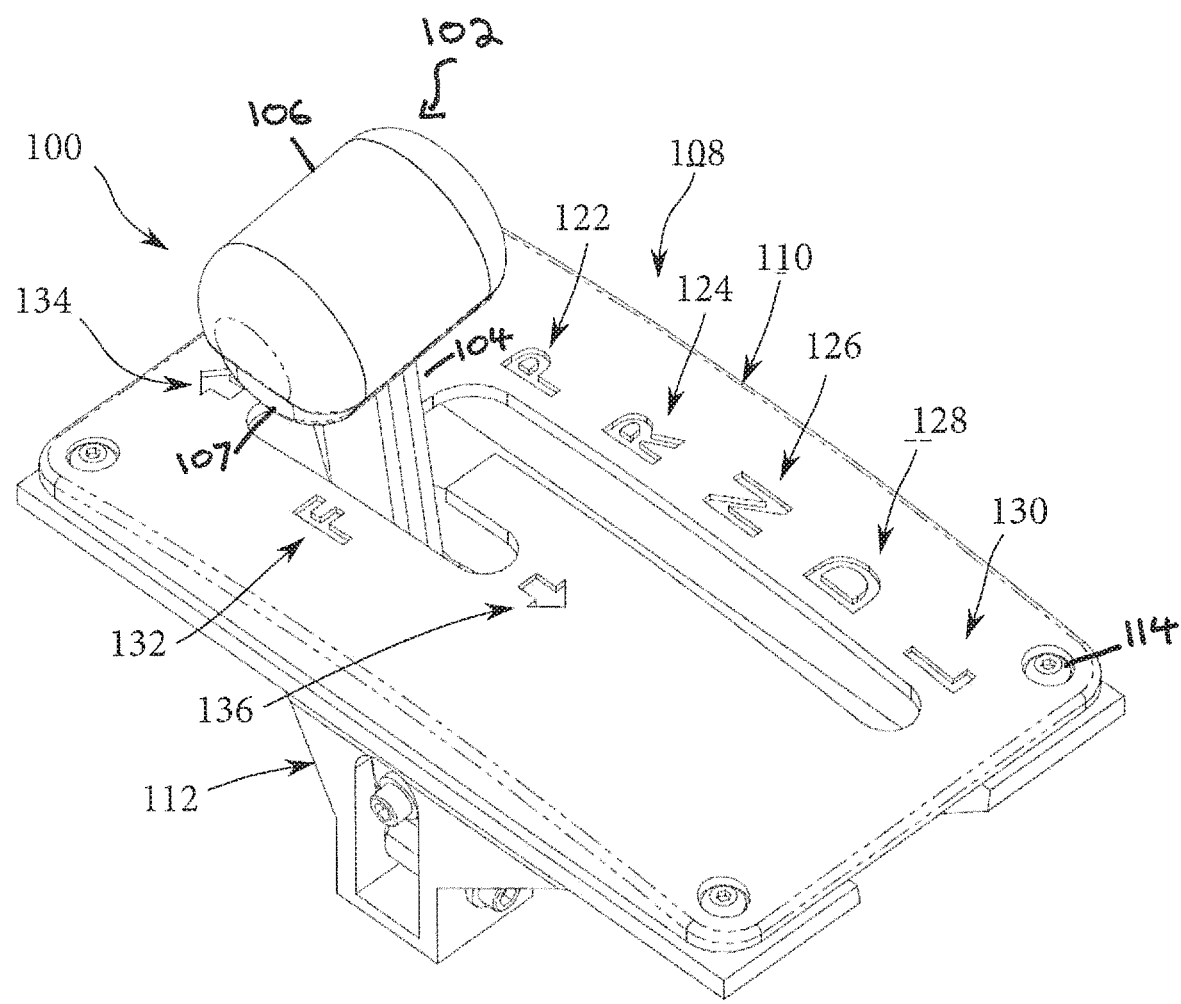
FIG. 1A is an isometric view of one embodiment of the shifter assembly in accordance with an embodiment of the invention.

FIG. 1A illustrates one embodiment of an electronic gear shifter assembly 100 for a dual-mode flying and driving vehicle. The gear shifter assembly 100 may include a lever 102 having a gear stick 104 and a shift knob 106 disposed at the end of the gear stick 104. The gear stick 104 and shift knob 106 may be formed of a rigid material, e.g., plastic or metal. The lever 102 may be sized to be operated by a user such that the shift knob 106 fits in the user's hand. In some embodiments, a shift button 107 may be located on the shift knob 106. The user may be required to press the lever 102 and/or the shift button 107 to move the lever 102 between shift positions, except to move the selector lever between Reverse and Neutral, and to move the selector lever between Drive and Neutral as a safety measure.

The lever 102 is mounted in a housing 108 that includes a rectangular plate 110 positioned on top of a lower housing 112. The lower housing 112 is sized and shaped to house the mechanical components of the gear shifter assembly 100. The lower housing 112 may also be sized to house electronic components, e.g., sensors. The plate 110 and the lower housing 112 may be connected with fasteners 114, e.g., bolts. The plate 110 may be 4 inches×7 inches. The lower housing may be 4 inches×4 inches×7 inches. In some embodiments, the sizing of the plate 110 and lower housing 112 may vary for aesthetic or design purposes, or to accommodate various sizes of shift lever assemblies. The components of the housing 108 may be made of a rigid material, such as plastic, sheet metal, or the like. The contents and configuration of the lower housing 112 will be discussed in further detail below with reference to FIGS. 2-3.

Figure 1B:
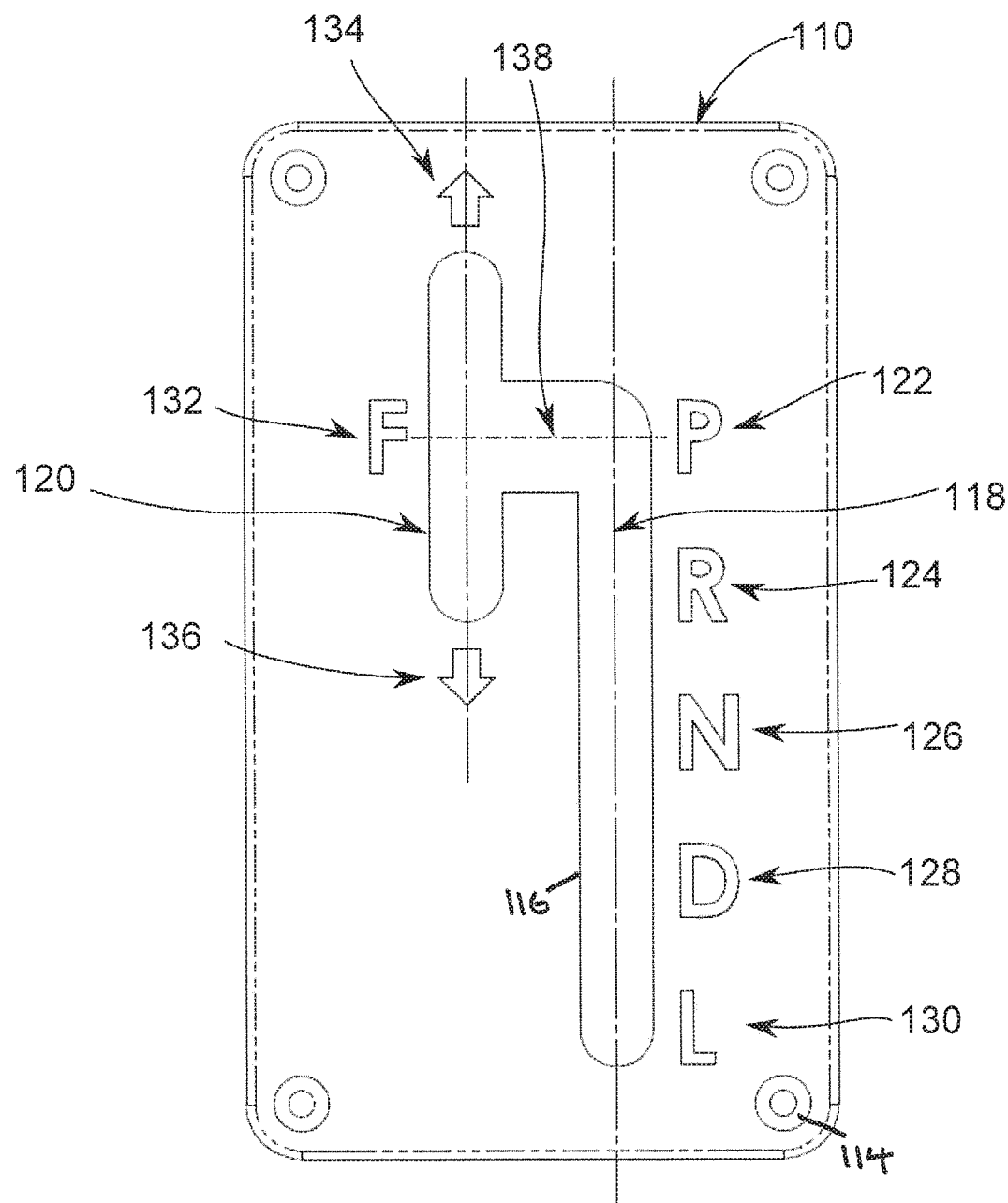
FIG. 1B is a top view of the shifter assembly plate in accordance with an embodiment of the invention.

Referring to FIG. 1B as well as FIG. 1A, the plate 110 defines an opening 116 through which the lever 102 may be disposed. The opening 116 defines a longitudinal first shifting path 118 and a longitudinal second shifting path 120 parallel to the first shifting path 118. The first shifting path 118 may include at least one drive-related positions. For example, the first shifting path 118 may include shift positions for P=Park 122, R=Reverse 124, N=Neutral 126, and D=Drive 128, in that order, that are marked on the plate 110. The first shifting path 118 may also include additional drive-related shift positions, such as L=Low 130. The second shifting path 120 may include at least one flying-related position. For example, the second shifting path 120 may include shift positions F=Fly 132; ↑=Up 134; and ↓=Down 136. The F=Fly position 132 may be reached from the Park position 122 by transversely moving the lever 102 from the first shifting path 118 to the second shifting path 120 via a transversely oriented shifting path 138. When the lever 102 is in the Fly position 132, the user may move the lever to the fore, or Up position, 134 or the aft, or Down, position 136 to actuate functions related to vehicle flight. A spring return mechanism familiar to those skilled in the art may be used to center the lever 102 in the second shifting path 120 in the F position 132.

In some embodiments, the lever 102 includes spring detents to alert the user when the lever 102 is reaching each gear shift position. In an alternative arrangement, the gear shift assembly may not include a shift knob, and the first shifting path may be a nonlinear path including both longitudinal and transverse path sections.

Figure 2:
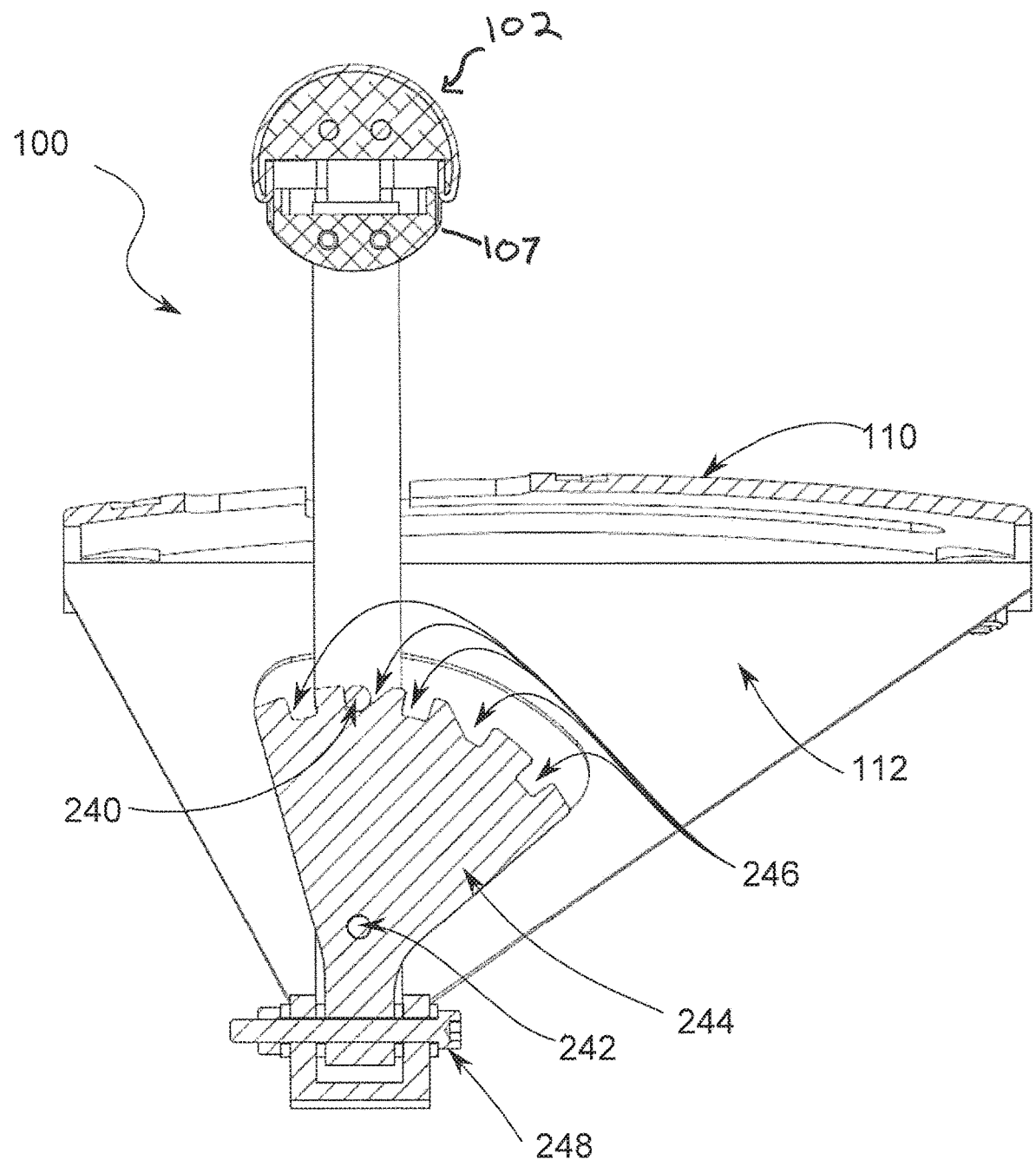
FIG. 2 is a cross-sectional side view of the shifter assembly in accordance with an embodiment of the invention.

Referring to FIG. 2, the gear stick 104 may include a shift pin 240 located on the gear stick 104 below the plate 110. The shift pin 240 may be lifted by pressing the shift button 107 allowing the lever 102 to pivot about a shaft 242 aligned orthogonally to a detent plate 244. The gear selector pin 240 sits in individual detents 246 located in the detent plate 244. Each detent 246 corresponds to a gear shift position, e.g., Park 122, Neutral 124, Drive 128, etc. The detent plate 244 may be mounted pivotably to the lower housing 112 on a shaft 248 aligned with the longitudinal direction of the vehicle. Gear shifter assemblies, familiar to one of skill in the art, typically include one or more or the above described components.

A cardanic mounting scheme may allow the lever 102 to be pivoted in orthogonal directions. For example, the lever 102 may be pivoted longitudinally along the first shifting path 118, the second shifting path 120, and transversely along the path 138 between the first and second shifting paths 118, 120. Exemplary cardanic joints include universal joints available from Lovejoy, Inc. (Downers Grove, Ill.).

Figure 3:
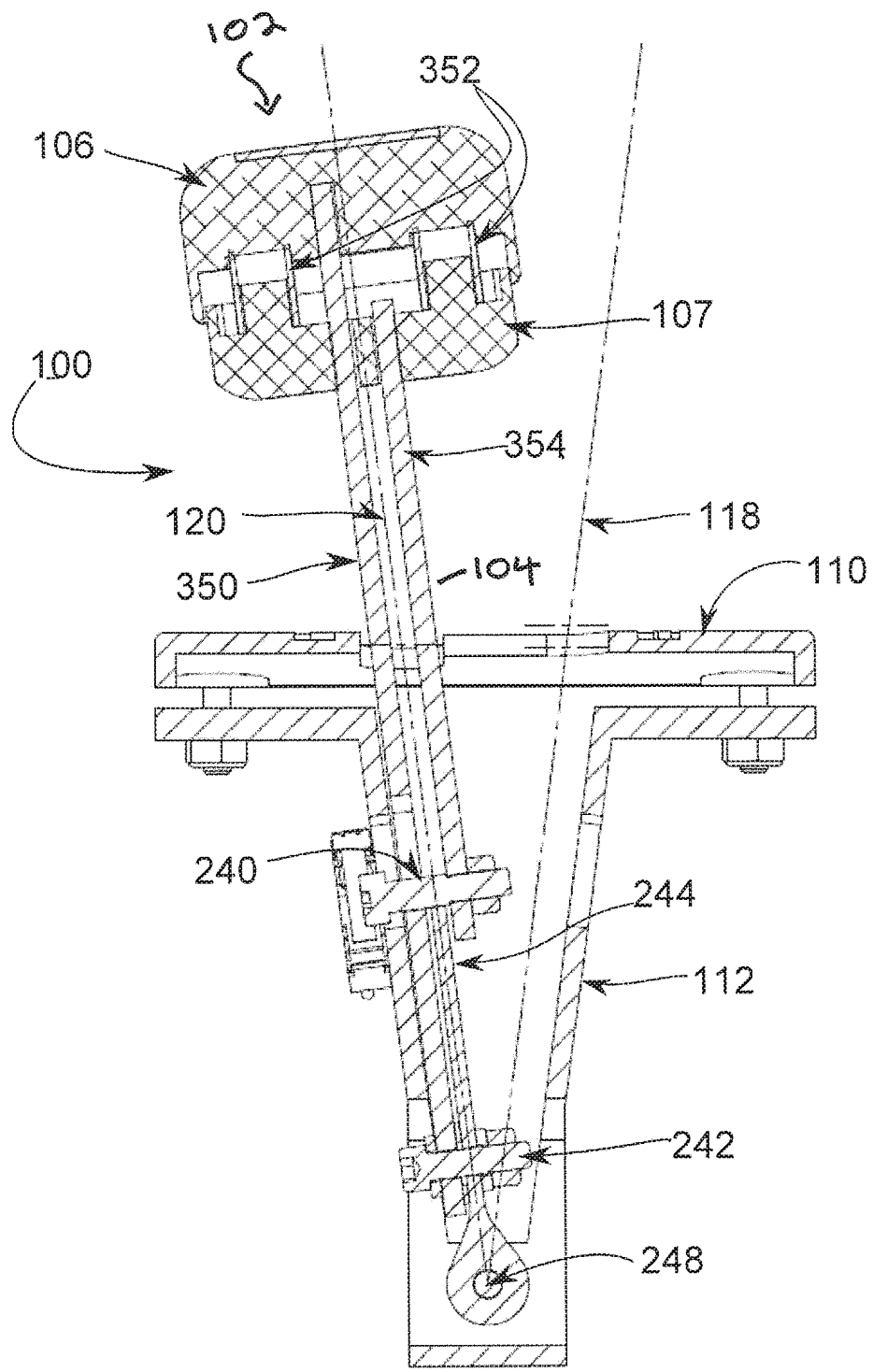
FIG. 3 is a cross-sectional front view of the shifter assembly in accordance with an embodiment of the invention.

A cross-sectional front view of the gear shifter assembly may be seen in FIG. 3. The gear stick 104 includes a pivoting lever 350 affixed to shaft 248. In some embodiments, the shift button 107 may be located below the shift knob 106 and may contain a slot allowing the pivoting shifter lever 350 to pass through the gear stick 104 to the shift knob 106. One or more springs 352 may be located between the shift knob 106 and shift button 107 that restore the shift button 107 to a neutral position after it is released. The pivoting lever 350 allows the lever 102 to be moved between the first shifting path 118 and the second shifting path 120. In some embodiments, the pivoting lever 350 may be affixed internally to the shift knob 106.

In some embodiments, the shift button 107 is affixed to a sliding lever 354 that is parallel to the pivoting shifter lever 350 and also housed within the gear stick 104. When the shift button 107 is not pressed, the springs 352 press the sliding lever 354, and thus the gear selector pin 240, down into individual detents 246 on the detent plate 244. A user may pivot the lever 102 along the first shifting path 118 or second shifting path 120 by pressing the shift button 107 up, which slides the sliding lever 354 up, removing the gear selector pin 240 from the detents 246, and allowing the lever 102 to rotate freely in the longitudinal direction.

Figure 4A:
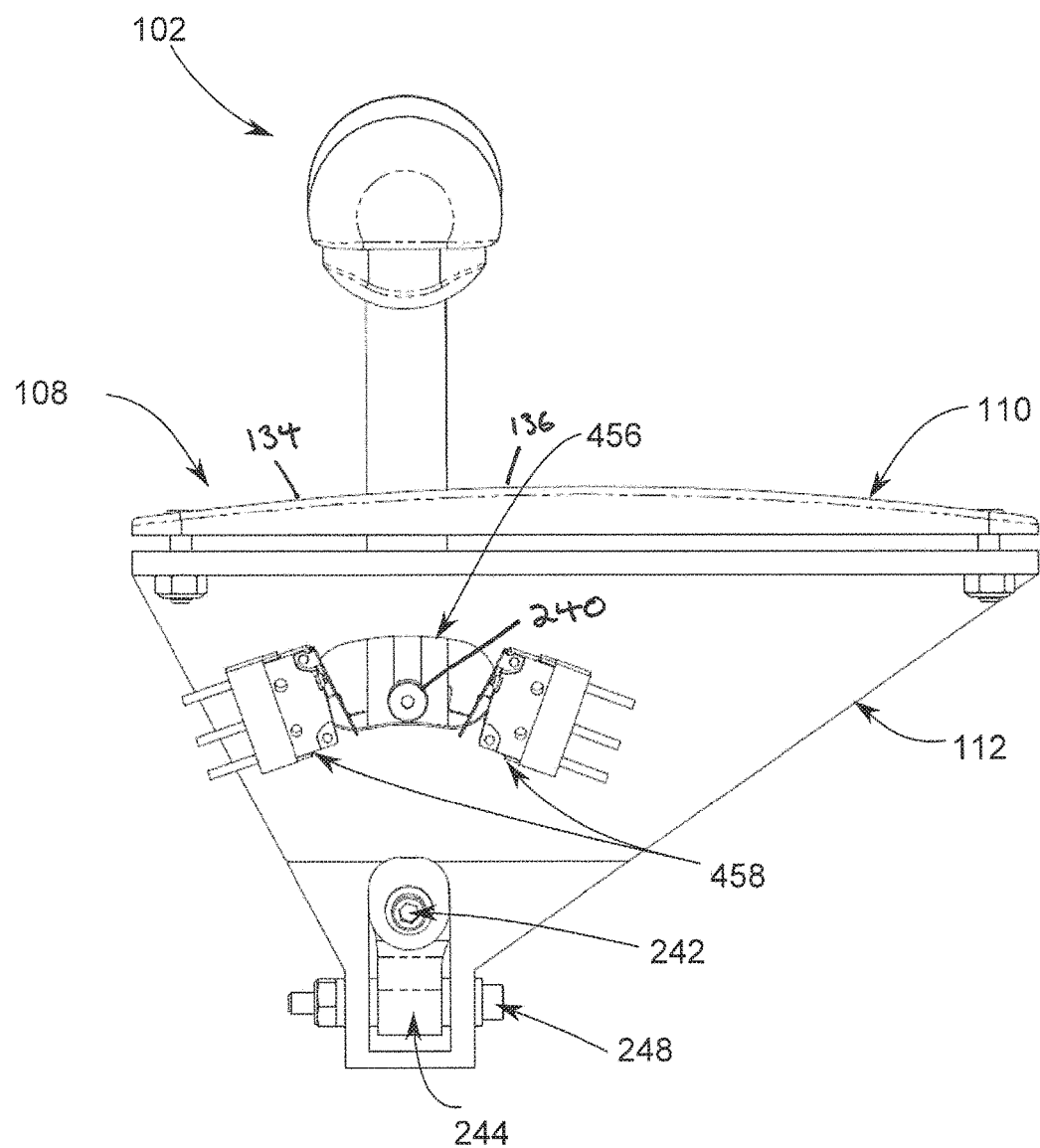
FIGS. 4A and 4B are front and side views of the shifter assembly in accordance with an embodiment of the invention.
Figure 4B:
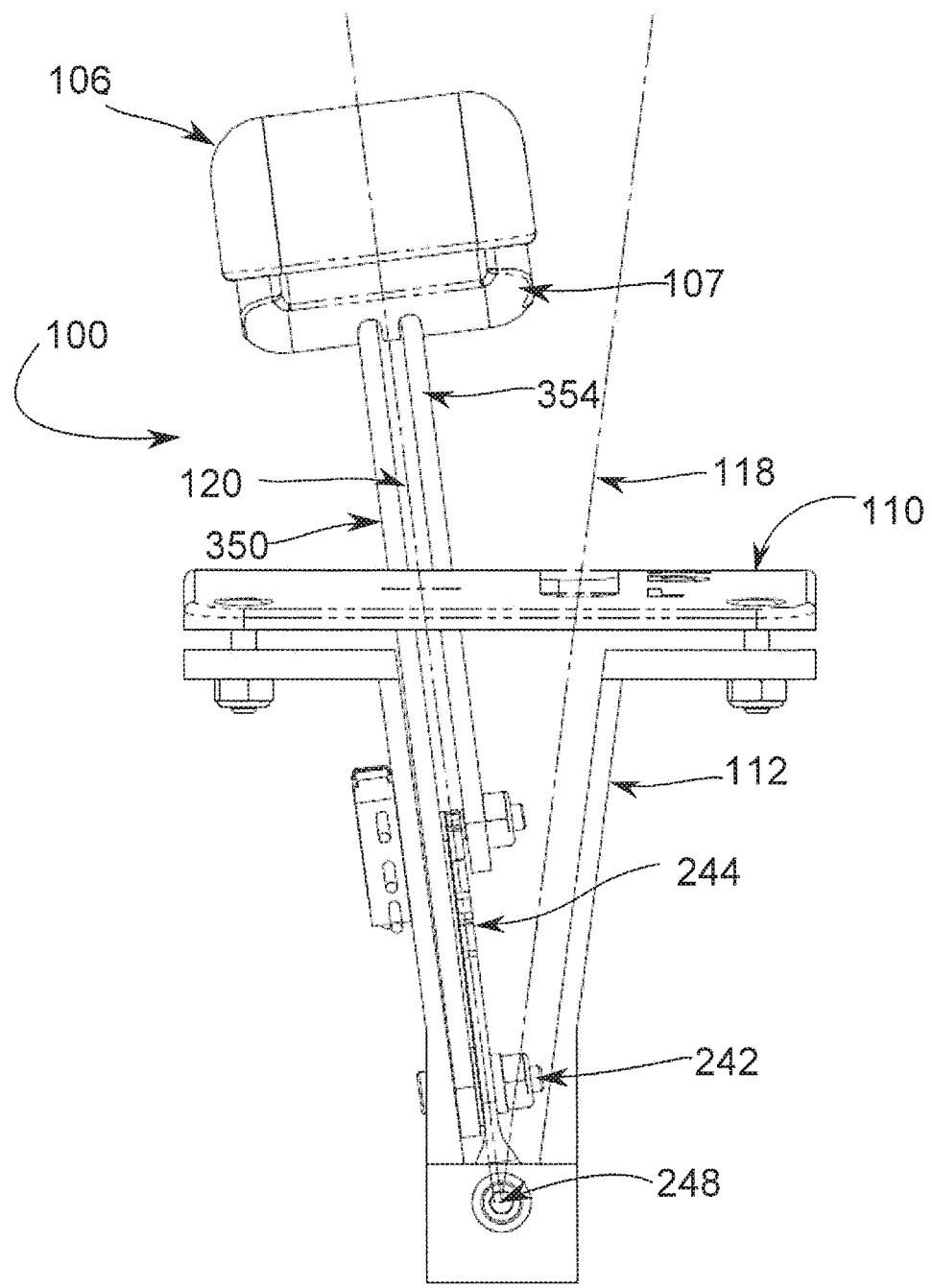

One embodiment of the shifting paths of lever assembly 100 is shown in FIGS. 4A (side view) and 4B (front view). When the lever 102 is transversely moved from the first shifting path 118 to the second shifting path 120, the gear selector pin 240 protrudes through an opening 456 in the lower housing 112. When a user moves lever 102 longitudinally forward towards the Up position 134 or aft towards the Down position 136, the gear selector pin 240 engages with a limit switch 458, sending a command signal to the vehicle's onboard computer. The limit switch 458 may be, for example, a D2SW-P2L1M switch by Omron Corporation (Kyoto, Japan).

Embodiments of the invention may use electronics to determine whether the selector lever is in either the Up or Down position. One preferred method is to use discrete sensing, such as a limit switch to determine whether the selector lever is pressed into the Up position or Down position. Any other type of sensor that provides a discrete signal may be used for this purpose. Another method of sensing the selector lever's position relative to the Up/Down gear shift positions is to use continuous sensing, such as a potentiometer, to determine to what degree the user is pressing the lever. Any other type of continuous sensor may be used for this purpose.

Embodiments of the present invention use electronics rather than mechanical elements to shift the vehicle's transmission. The lever 102 may be outfitted with a sensor that determines the gear shift position the lever 102. Additionally, a series of Hall effect sensors, familiar to those skilled in the art, may be used to sense the gear shift position of the lever. One preferred method of sensing is to use Hall effect magnetic sensors, but this may be accomplished using several other types of sensors, including optical encoders, potentiometers, etc. For example, the lever 102 may include a magnet positioned to align with a Hall effect sensor at each shift position. A software algorithm running on an associated processor or controller may read the relative magnetic field levels at each sensor to determine which shift position the lever 102 is in. This method may be advantageous, as it increases reliability and decreases the number of moving parts necessary to shift between gears. In some embodiments, potentiometers or optical encoders may be used to reduce cost.

During certain vehicle operational modes, it may be desirable to mechanically lock the shifter lever from moving between either: Park and Fly, or Park and Reverse. This may be accomplished by one or more solenoid-powered linkages that are commanded by the vehicle's on-board software based on the state of the vehicle. Alternatively, this may be accomplished using servos, linear actuators, etc.

Figure 5A:
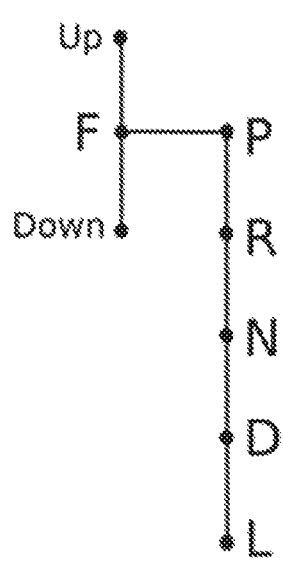
FIG. 5A-5I illustrate various alternative embodiments of the shift line.
Figure 5B:
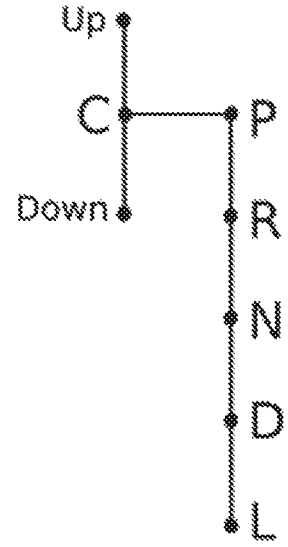

Referring to FIGS. 5A-5I, which show alternative arrangements of shifting paths, the second shifting path may instead include shift positions related to conversion of the vehicle between its driving configuration and its flying configuration, such as folding and unfolding the wings. In this arrangement, the second shifting path includes a C=Convert shift position, and Up and Down positions for folding the wings up and down (FIG. 5B). Similar to the above arrangement, there may be a mechanism to restore the selector lever to the Convert position when a user pushes the lever into either Up or Down and releases the lever.

Figure 5C:
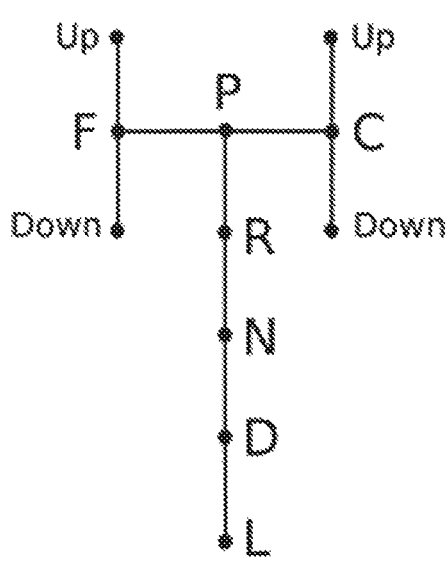
Figure 5D:
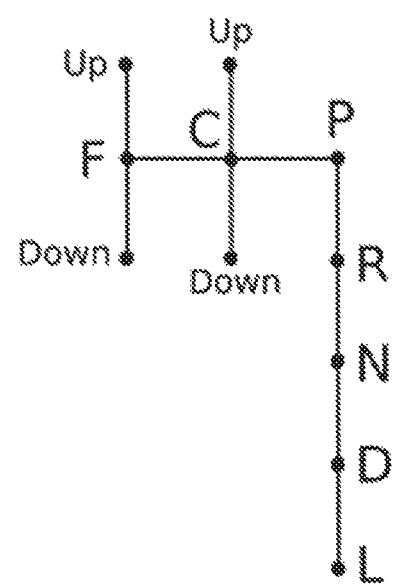

In another alternative arrangement, the assembly may include an additional (a third) shifting path. Here, one shifting path includes the drive related shift positions and the second includes the flight related shift positions, as mentioned previously, and the third includes the configuration change related shift positions. The second and third shifting paths may be located on opposite sides of the first shifting path (FIG. 5C). In this case, the transverse path links Park to Fly on the second shifting path, and also to C on the third shifting path. The second and third shifting paths may also be located on the same side of the first shifting path, in which case the transverse path links Park to Convert, and Convert to Fly (FIG. 5D).

Figure 5E:
Figure 5F:
Figure 5G:
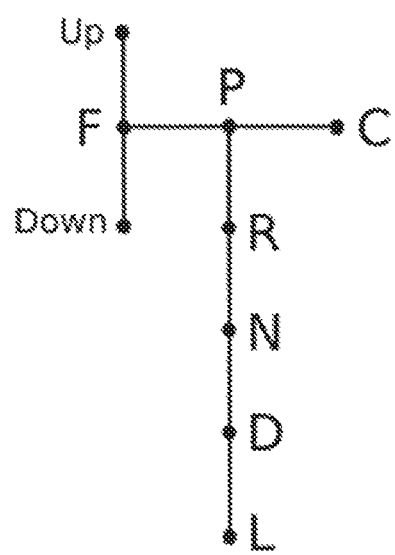
Figure 5H:
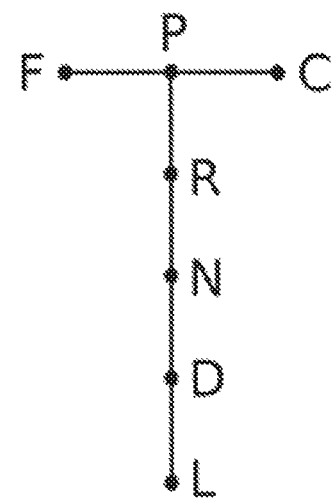
Figure 5I:
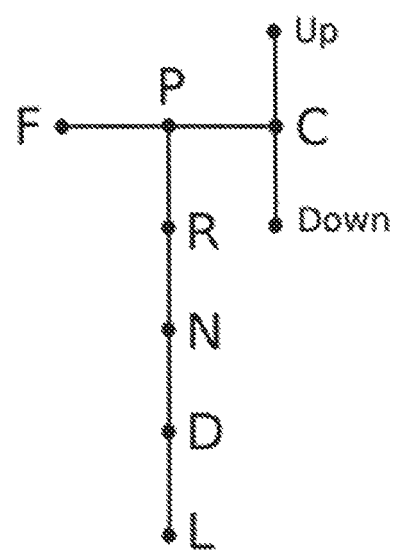

In another alternative arrangement, the shifting path includes only one longitudinal shifting path and one transverse shifting path. The transverse shifting path goes through Park and includes either Fly, Convert, or both (FIGS. 5E, 5F, and 5H). In this arrangement, there may be no Up/Down positions.

In some embodiments, for the selector lever to move along a longitudinal shifting path and a transverse shifting path, the lever may be capable of pivoting in at least two directions, the longitudinal direction and the transverse direction (FIGS. 5A-5D, 55G, and 5I). One preferred method is to use a four bar linkage, but this may also be accomplished using a cardanic joint, a rubber joint, or a ball joint. For example, a cardanic joint may be a pin-and-block U-joint by McMaster-Carr (Elmhurst, Ill.). A suitable rubber joint may be a tiller universal joint available from West Coast Sailing (Portland, Oreg.).

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

What is claimed is:

1. An electronic gear shifter assembly for a dual-mode flying and driving vehicle, the electronic gear shifter assembly comprising:
   a lever moveable between
      a first shifting path comprising a plurality of drive-related operating positions including at least a park position, a reverse position, a neutral position and a drive position; and
      a second shifting path comprising a plurality of flying-related operating positions including at least a fly position, an up position and a down position; and
   at least one sensor configured to electronically sense a user-selectable one of the plurality of operating positions of the lever and generate a signal uniquely corresponding to the user-selectable one of the plurality of operating positions,
   wherein the lever is only moveable between the first shift path and the second shift path when the lever is in the park position or the fly position.

2. The electronic gear shifter assembly of claim 1, further comprising:
   a plate defining an opening, wherein the lever is disposed through the opening.

3. The electronic gear shifter assembly of claim 2, wherein the plate comprises indicators of the drive-related and flying-related operating positions.

4. The electronic gear shifter assembly of claim 1, wherein the drive-related operating positions are selected from the group consisting of park, reverse, neutral, drive and low positions.

5. The electronic gear shifter assembly of claim 1, wherein the at least one flying-related operating position is selected from the group consisting of fly, up, and down positions.

6. The electronic gear shifter assembly of claim 1, wherein the lever further comprises
   a pivot operably coupled to an end of the lever; and
   a shift knob operably coupled to an opposite end of the lever, the shift knob being configured to be manipulated by a hand of a user,
   wherein the lever is at least pivotably moveable between the first shifting path and the second shifting path.

7. The electronic gear shifter assembly of claim 1, further comprising a spring mechanism adapted to return the lever to a central position in the second shifting path.

8. The electronic gear shifter assembly of claim 1, wherein the at least one sensor is an electronic sensor is selected from the group consisting of a limit switch, a Hall effect sensor, and a potentiometer.

9. The electronic gear shifter assembly of claim 6, wherein the shift knob further includes a shift button configured to be selectively engaged by a user to permit movement of the lever.

10. The electronic gear shifter assembly of claim 1, further comprising a mechanical lock mechanism to prevent the lever from moving between the first shifting path and the second shifting path.

11. The electronic gear shifter assembly of claim 4, further comprising a mechanical lock mechanism to prevent the lever from moving between the park and reverse positions.

12. The electronic gear shifter assembly of claim 6, wherein the lever is configured to pivot in at least two directions, a longitudinal direction and a transverse direction.

* * * * *